（12） United States Patent
Gavin et al.

(10) Patent No.: US 10,519,832 B2
(45) Date of Patent: Dec. 31, 2019

(54) DECOMPOSITION TUBE FOR EXHAUST TREATMENT SYSTEMS

(71) Applicant: Deere & Company, Moline, IL (US)

(72) Inventors: William F. Gavin, Cedar Falls, IA (US); Nathan A. Bovee, Cedar Falls, IA (US); Marc J. Andvik, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/167,442

(22) Filed: May 27, 2016

(65) Prior Publication Data

US 2017/0342886 A1    Nov. 30, 2017

(51) Int. Cl.
| | | |
|---|---|---|
| *F01N 3/20* | (2006.01) | |
| *F01N 3/28* | (2006.01) | |
| *B01F 5/02* | (2006.01) | |
| *F01N 3/021* | (2006.01) | |

(52) U.S. Cl.
CPC .......... *F01N 3/2066* (2013.01); *B01F 5/0268* (2013.01); *F01N 3/021* (2013.01); *F01N 3/2892* (2013.01); *F01N 2330/12* (2013.01); *F01N 2610/02* (2013.01); *F01N 2610/1453* (2013.01)

(58) Field of Classification Search
CPC ........ F01N 3/206; F01N 3/2066; F01N 3/208; F01N 2610/00; F01N 2610/02; F01N 2610/03; F01N 1/088; F01N 2230/02; F01N 2240/20; F01N 2240/40; F01N 2330/12; F01N 2590/08; F01N 2610/1453; F01N 3/021; F01N 3/103; F01N 3/2892; B01F 3/04049; B01F 5/0268; B01F 5/0473; Y02T 10/24

USPC ................... 60/286, 297, 301, 303, 311, 324
See application file for complete search history.

(56) References Cited

U.S. PATENT DOCUMENTS

| | | | | |
|---|---|---|---|---|
| 7,581,387 B2 * | 9/2009 | Bui | ......................... | F01N 3/101 60/274 |
| 8,033,104 B2 * | 10/2011 | Zhang | ....................... | F01N 3/36 60/295 |
| 8,240,137 B2 * | 8/2012 | Liu | ....................... | F01N 3/2066 239/433 |

(Continued)

FOREIGN PATENT DOCUMENTS

WO    2009085641 A1    7/2009

OTHER PUBLICATIONS

European Patent Office, Extended European Search Report in Application No. 17170920.7-1616 dated Aug. 14, 2017.

*Primary Examiner* — Thai Ba Trieu
*Assistant Examiner* — Diem T Tran
(74) *Attorney, Agent, or Firm* — Klintworth & Rozenblat IP LLP

(57) ABSTRACT

A decomposition tube for an exhaust treatment system includes a housing with a housing wall that defines an exhaust flow path for exhaust; a reductant delivery mechanism coupled to the housing and having a nozzle configured to deliver a spray of reductant into the exhaust flow path; and a mesh device with a mounting element mounted on the housing wall and a mesh basket secured to the mounting element proximate to the nozzle to enclose and intercept the spray such that effectively all of the reductant passes through the mesh basket and into the exhaust flow path prior to impinging on the housing wall.

17 Claims, 3 Drawing Sheets

(56) References Cited

U.S. PATENT DOCUMENTS

| | | | |
|---|---|---|---|
| 8,359,832 B2 * | 1/2013 | Yi | B01F 3/04049 |
| | | | 422/172 |
| 8,528,884 B2 | 9/2013 | Maus et al. | |
| 8,641,019 B2 | 2/2014 | Grassmann et al. | |
| 9,587,543 B2 | 3/2017 | Haverkamp et al. | |
| 2010/0005790 A1 * | 1/2010 | Zhang | F01N 3/36 |
| | | | 60/301 |
| 2010/0170233 A1 * | 7/2010 | Tangemann | B01D 53/90 |
| | | | 60/299 |
| 2010/0319329 A1 | 12/2010 | Khadiya | |
| 2011/0023461 A1 | 2/2011 | Strots et al. | |
| 2011/0061374 A1 * | 3/2011 | Noritake | F01N 3/035 |
| | | | 60/286 |
| 2011/0094206 A1 | 4/2011 | Liu et al. | |
| 2011/0107750 A1 * | 5/2011 | Kowada | B01D 53/944 |
| | | | 60/299 |
| 2013/0164182 A1 * | 6/2013 | Iijima | F01N 3/2066 |
| | | | 422/169 |
| 2014/0196444 A1 * | 7/2014 | Watahiki | F01N 3/035 |
| | | | 60/297 |
| 2014/0334987 A1 | 11/2014 | Stanavich et al. | |
| 2015/0044103 A1 | 2/2015 | Sampath et al. | |

* cited by examiner

DECOMPOSITION TUBE FOR EXHAUST TREATMENT SYSTEMS

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure generally relates to work vehicles, and more specifically to exhaust treatment systems and methods for a work vehicle.

BACKGROUND OF THE DISCLOSURE

A work vehicle in the form of a construction vehicle, an agricultural vehicle, or a forestry vehicle, typically includes a power system with an internal combustion engine. The engine may either be in the form of a compression ignition engine (i.e., diesel engine) or a spark ignition engine (i.e., gasoline engine). For most heavy work vehicles, the power system is in the form of a diesel engine having better lugging, pull-down and torque characteristics for associated work operations. In addition to the engine, power systems typically include a treatment system to reduce emission levels of particulate and nitrogen oxides (NOx) in the engine exhaust.

SUMMARY OF THE DISCLOSURE

The disclosure provides an exhaust treatment system and method for a power system of a work vehicle.

In one aspect, the disclosure provides a decomposition tube for an exhaust treatment system. The decomposition tube includes a housing with a housing wall that defines an exhaust flow path for exhaust; a reductant delivery mechanism coupled to the housing and having a nozzle configured to deliver a spray of reductant into the exhaust flow path; and a mesh device with a mounting element mounted on the housing wall and a mesh basket secured to the mounting element proximate to the nozzle to enclose and intercept the spray such that effectively all of the reductant passes through the mesh basket and into the exhaust flow path prior to impinging on the housing wall.

In another aspect, the disclosure provides an exhaust treatment system for treating exhaust from an engine. The system includes an inlet tube for receiving the exhaust from the engine; a particulate filter fluidly coupled to receive the exhaust from the inlet tube; a selective catalytic reduction system coupled to receive the exhaust from the particulate filter; and an outlet tube coupled to receive the exhaust from the selective catalytic reduction system. The selective catalytic reduction system includes a decomposition tube with a housing defining an exhaust flow path for the exhaust, a reductant delivery mechanism coupled to the housing and including a nozzle configured to deliver a spray of reductant into the exhaust flow path, a mesh device mounted proximate to the nozzle to intercept the spray such that effectively all of the reductant passes through the mesh device and mixes with the exhaust, and a catalyst device fluidly coupled to receive the mixture of the reductant and the exhaust from the decomposition tube and configured to reduce NOx in the exhaust with the reductant.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
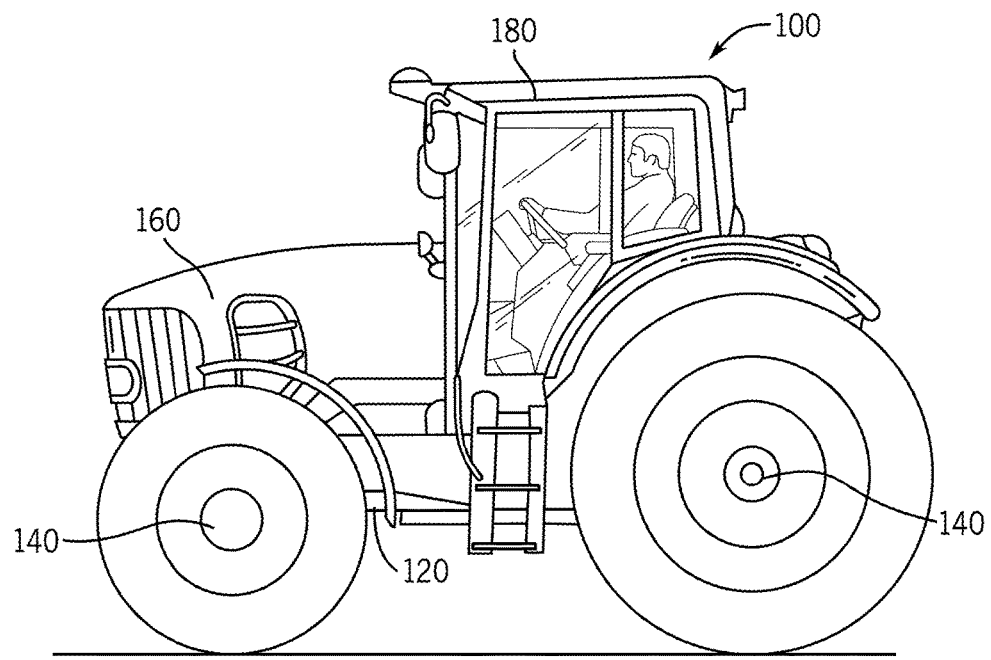
FIG. 1 is a side view of an example work vehicle in the form of a tractor in which an exhaust treatment system and method may be used in accordance with this disclosure.

The following describes one or more example embodiments of the disclosed exhaust treatment system and method, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Furthermore, in detailing the disclosure, terms of direction and orientation, such as "downstream," "upstream," "longitudinal," "radial," "axial," and "circumferential," may be used. Such terms are defined, at least in part, with respect to the annular decomposition tube and the direction of the exhaust flowing therethrough.

For the sake of brevity, conventional techniques related to work vehicle and engine operation, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

As noted, work vehicles may include power systems with diesel engines to produce torque in a wide range of applications, such as long-haul trucks, tractors, agricultural or construction vehicles, surface mining equipment, non-electric locomotives, stationary power generators and the like. During the combustion process, diesel engines may generate particulates, nitrogen oxides (NOx), and other types of pollutants that are subject to increasingly strict emissions standards. As such, engine and equipment manufacturers have developed systems for reducing the levels of pollutants released into the environment. For example, some work vehicles utilize an exhaust treatment system, such as a Selective Catalytic Reduction (SCR) system to reduce NOx emissions from diesel engine exhaust. In one example of an SCR exhaust treatment system, NOx is reacted with reductant compounds such as ammonia to generate reduced forms of nitrogen and other, less harmful components.

The reductant compounds used in exhaust treatment systems are typically stored as liquids and may be referred to as "Diesel Exhaust Fluid" (DEF). In one example, the reductant is a mixture of urea and demineralized water that is sprayed into a decomposition tube to be converted into ammonia and mixed with engine exhaust for NOx reduction. As the reductant is sprayed into the decomposition tube, temperature differences between the reductant and the surfaces of the decomposition tube may result in the liquid reductant impinging on the surface prior to conversion and sublimating on the surface to result in a solid deposit. These deposits may impact exhaust flow characteristics and reduce efficiency. Various approaches to this issue have been proposed, but conventional approaches may have issues with complexity, cost, and effectiveness.

The following describes one or more example implementations of the disclosed systems and methods for reducing deposits in an exhaust treatment system as compared to conventional systems. Examples achieve this improvement by enhancing atomization and evaporation of the reductant prior to impingement on a surface. Discussion herein may sometimes focus on the example application of an exhaust treatment system in a tractor, but the exhaust treatment system is applicable to other types of work vehicles and/or other types of engine systems.

Referring to FIG. 1, in some embodiments, the disclosed exhaust treatment systems and methods may be used with a work vehicle 100. As shown, the work vehicle 100 may be considered to include a main frame or chassis 120, a drive assembly 140, a power system 160, and an operator platform or cabin 180. As is typical, the power system 160 includes an internal combustion engine used for propulsion of the work vehicle 100 via the drive assembly 140 based on commands from an operator in the cabin 180. During operation, the internal combustion engine of the power system 160 generates exhaust. As such, the power system 160 further includes an exhaust treatment system that functions to reduce pollutants prior to emission of the engine exhaust into the atmosphere. Additional details about the exhaust treatment system will be provided with reference to FIGS. 2-5.

Figure 2:
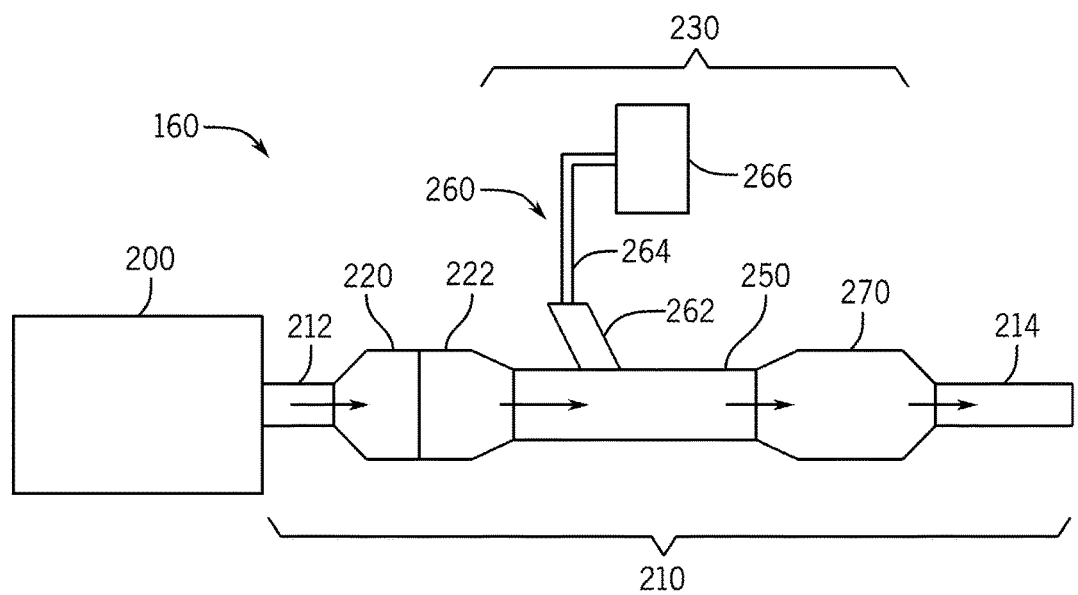
FIG. 2 is a functional block diagram of an exhaust treatment system in accordance with an example embodiment.

Referring to FIG. 2 and as introduced above, the power system 160 includes the internal combustion engine 200 and the exhaust treatment system 210. Generally, the engine 200 may be any kind of internal combustion engine that produces an exhaust gas, such as a gasoline engine, a diesel engine, a gaseous fuel burning engine (e.g., natural gas) or any other exhaust producing engine. As an example, the engine 200 described below is a diesel engine. The engine 200 may be of any size, with any number cylinders, and in any configuration. The engine 200 may include other features not shown, such as controllers, fuel systems, air systems, cooling systems, peripheries, drivetrain components, turbochargers, exhaust gas recirculation systems, etc.

The exhaust treatment system 210 is oriented downstream of the engine 200 to receive the exhaust. In one example, the exhaust treatment system 210 includes an inlet tube 212, diesel oxidation catalyst (DOC) 220, a diesel particulate filter (DPF) 222, a selective catalytic reduction (SCR) system 230, and an outlet tube 214. Generally, the exhaust from the engine 200 flows through the inlet tube 212, the DOC 220, the DPF 222, and the SCR system 230, and is expelled through the outlet tube 214, which may be the tailpipe of the vehicle 100 (FIG. 1).

The DOC 220 may be configured in a variety of ways and contain catalyst materials useful in collecting, absorbing, adsorbing, and/or converting hydrocarbons, carbon monoxide, and/or nitrogen oxides (NOx) contained in the exhaust. Such catalyst materials may include, for example, aluminum, platinum, palladium, rhodium, barium, cerium, and/or alkali metals, alkaline-earth metals, rare-earth metals, or combinations thereof. In some examples, the DOC 220 may be omitted.

The DPF 222 may be any of various particulate filters known in the art configured to reduce particulate matter concentrations, e.g., soot and ash, in the exhaust. Any structure capable of removing particulate matter from the exhaust of the engine 200 may be used. For example, the DPF 222 may include a wall-flow ceramic substrate having a honeycomb cross-section constructed of cordierite, silicon carbide, or other suitable material to remove the particulate matter. In some examples, the DPF 222 may be omitted.

Generally, the SCR system 230 functions to reduce the amount of NOx in the exhaust flow. In one example, the SCR system 230 includes a decomposition tube 250, a reductant delivery mechanism 260, and an SCR catalyst device 270.

The reductant delivery mechanism 260 is controllable to selectively inject an amount of reductant into the flow of exhaust within the decomposition tube 250. In one example, the reductant is diesel emissions fluid (DEF) that is a solution of urea and deionized water, such as 32.5% high purity urea and 67.5% deionized water, although other reductant solutions may be used.

In one example, the reductant delivery mechanism 260 includes a reductant injection assembly 262 fluidly coupled to receive the reductant from a reductant tank 266 via conduit 264. The reductant tank 266 stores the reductant in liquid form for transfer to the injection assembly 262. Although not shown, the delivery mechanism 260 may include, as examples, any suitable valves, orifices, sensors, pumps, heating and/or cooling elements, control elements, and/or other components to facilitate delivery of the reductant to the decomposition tube 250.

As described in greater detail below, the decomposition tube 250 facilitates the mixing of the reductant and the exhaust. In one example, upon injection of the liquid reductant, the reductant evaporates and the urea decomposes or hydrolyzes in the decomposition tube 250 to produce ammonia, which is mixed with the exhaust flow upstream of the SCR catalyst device 270. As described in greater detail below, the decomposition tube 250 may be advantageously configured to reduce the occurrence of undesirable solid deposits formed by the reductant on the interior portions of the decomposition tube 250.

The SCR catalyst device 270 may include any of various catalysts known in the art disposed on a substrate. In the SCR catalyst device 270, the ammonia reacts with NOx to reduce the NOx into less harmful emissions, such as $N_2$ and $H_2O$. As examples, the SCR catalyst device 270 may include a vanadium-based catalyst or mixed metal oxides, or the SCR catalyst device 270 may include a zeolite-based catalyst, such as a Cu-zeolite or a Fe-zeolite Although not shown, the SCR system 230 and the overall exhaust treatment system 210 may include any suitable sensors, control elements, heating and/or cooling elements, and the like that facilitate operation. Other exhaust treatment devices may also be provided. For example, the treatment system 210 may include elements such as an ammonia oxidation catalyst (AOC) that further reacts ammonia to produce nitrogen. After treatment, the exhaust is vented into the atmosphere through the outlet tube 214. Additional details about the decomposition tube 250 will be provided below in the discussion of FIGS. 3-5.

Figure 3:
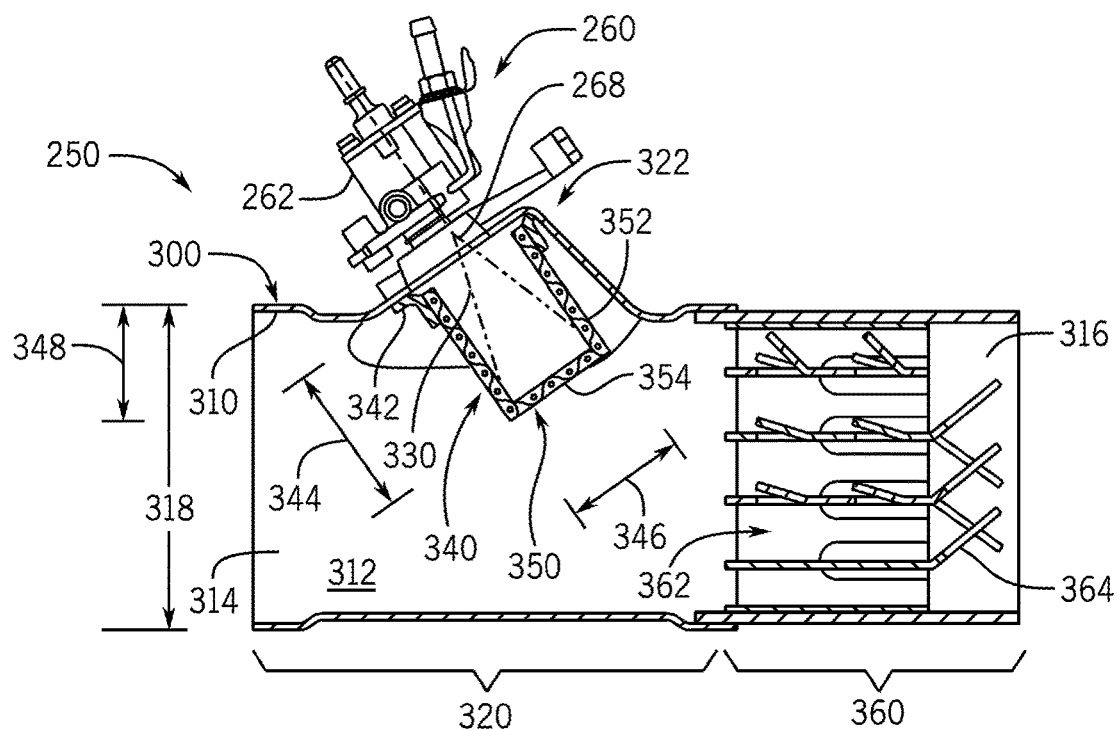
FIG. 3 is a cross-sectional view of a decomposition tube of the exhaust treatment system of FIG. 2 in accordance with an example embodiment.

FIG. 3 is a cross-sectional view of the decomposition tube 250 in accordance with an example embodiment. The decomposition tube 250 includes a housing 300 formed by a generally cylindrical wall 310. The housing wall 310 defines a flow path 312 for the exhaust and extends between an upstream end 314 and a downstream end 316. As previously noted in the description of FIG. 2, the decomposition tube 250 is arranged between other components of the exhaust treatment system 210, such as the DPF 222 at the upstream end 314 and the SCR catalyst device 270 at the downstream end 316. Although cylindrical in this example, other examples may have other cross-sectional shapes, such as square, rectangular, oval, and the like.

The decomposition tube 250 may be considered to have a dosing section 320 and a mixing section 360. The dosing section 320 is upstream of the mixing section 360. The housing wall 310 through sections 320, 360 may be formed by a unitary (or single) wall or by multiple wall portions that collectively form the flow path 312. In the depicted embodiments, the sections 320, 360 are generally coincident with one another such that the dosing section 320 has generally the same diameter as that of the mixing section 360, although other configurations are possible.

In the dosing section 320, the injection assembly 262 of the reductant delivery mechanism 260 is arranged to introduce the reductant into the exhaust in the flow path 312. In particular, the injection assembly 262 is mounted to the housing 300 at an injector interface 322 such that an outlet nozzle 268 delivers reductant directly into the flow path 312.

In one example, the injector interface 322 is an aperture in the housing wall 310 that positions the nozzle 268 in an appropriate location to deliver the reductant relative to the flow path 312. As shown, the injector interface 322 may include an angled flange 324 that forms a portion of the aperture such that the nozzle 268 is angled relative to a radial direction of the exhaust flow path 312. Any suitable orientation may be provided.

As noted above, the injection assembly 262 is configured to deliver a spray 330 of liquid reductant from the nozzle 268 into the decomposition tube 250. As is typical, the spray 330 initially exits the nozzle 268 as a stream and diffuses radially outward from the stream to, in effect, result in a conical spray pattern. This pattern may be impacted by a number of factors, including by the orientation of the nozzle 268 and the nature of the generally cross-flowing exhaust.

The decomposition tube 250 further includes a mesh device 340 oriented relative to the nozzle 268 such that the spray 330 passes through the mesh device 340. As shown, the mesh device 340 includes a mounting bracket 342 secured to the housing wall 310 in a manner that circumscribes the mounting aperture at the injector interface 322 through which the nozzle 268 delivers the spray 330. In one example, the mounting bracket 342 may be welded to the housing wall 310, although in other examples, the mounting bracket 342 may be unitary with, or otherwise formed by, the housing wall 310.

The mesh device 340 additional includes a mesh element 350 secured to the mounting bracket 342 in any suitable manner, including welding, adhesive, interference fittings, mechanical attachments such as clamps or cooperating surface features, and the like. The mesh element 350 is generally formed by an interwoven or intersecting material that forms a grid or network arrangement of material and intervening spaces that enable gas and liquid droplets of suitable size to flow through, as described in greater detail below. As a result of this shape and arrangement, the mesh element 350 may be considered a mesh basket and will be referred to below as such.

Generally, the mesh device 340, particularly the mesh basket 350 of the mesh device 340, functions to enclose the pattern of the spray 330 such that effectively all of the spray 330 passes through the mesh basket 350. Specifically, the mesh device 340 prevents any liquid in the spray 330 from impinging on any other surface of the decomposition tube 250, such as on the interior surfaces of the housing wall 310. As described below, this functions to mitigate or prevent the formation of solid deposits.

As noted above, the reductant is delivered to the decomposition tube 250 by the injection assembly 262 in liquid form. As the liquid exits the nozzle 268, the reductant begins evaporating to form ammonia gas, which subsequently reduces the NOx in the exhaust flow. However, as also noted above, if the liquid reductant impinges or strikes a surface of the housing wall 310 prior to evaporating, the liquid reductant may sublimate into a solid deposit. The mesh basket 350 functions to prevent or mitigate this occurrence.

Promoting the conversion of the reductant into ammonia is achieved by atomizing or breaking up the reductant spray 330 into smaller droplets. Smaller droplets encourage the evaporation of the water content in the reductant and quicken the conversion into ammonia. As noted above, the mesh basket 350 is formed by intersecting and/or interwoven wires or other material in a grid-configuration, the intervening spaces through which only sufficiently small droplets may pass. The mesh basket 350 functions to pass through the relatively small droplets while breaking up the relatively large droplets into smaller sizes that more readily evaporate. The evaporation and conversion of the reductant into ammonia is also facilitated by the relative temperature of the mesh basket 350. The size, material, and arrangement of the mesh basket 350 at least partially within the exhaust flow path 312 result in the temperature of the mesh basket 350 generally being higher than the reductant (and typically than the housing wall 310). The higher temperature encourages evaporation, further enhancing the likelihood of conversion of the reductant into ammonia prior to a droplet impinging upon the surface of the housing wall 310. In effect, the mesh basket 350 ensures that the characteristic time of the reductant evaporation is greater than the travel time of any liquid droplet from the nozzle 268 to a surface of the housing wall 310 or any other surface of the decomposition tube 250 other than the mesh device 340. Since effectively all of the reductant spray 330 is intercepted by and passes through the mesh basket 350, solid deposits are substantially reduced or eliminated. The size of the grid elements may be selected, as appropriate, to provide the proper atomization prior to impingement on any other surface while not creating unnecessary pressure drop for the exhaust.

Subject to intercepting effectively all of the spray 330 from nozzle 268, the mesh basket 350 may have any suitable size or shape. In the depicted example, the mesh basket 350 is formed by a generally cylindrical side wall 352 that has an open end proximate to the nozzle 268 and a closed end formed by a flat bottom wall 354. The cylindrical side wall 352 may have a circular cross-sectional shape, or more generally, any shape that surrounds the nozzle 268. In this example, the cylindrical side wall 352 is centered and aligned with the nozzle 268. As such, the side and bottom walls 352, 354 of the mesh basket 350 function to encircle and enclose the spray 330. The side wall 352 is coaxial along approximately the entire length of the spray 330 to prevent any of the spray 330 from failing to pass through the mesh basket 350. The bottom wall 354 is oriented to be perpendicular to the nozzle 268. In other examples, the mesh basket 350 may be offset relative to the nozzle 268 and/or may have a shape other than cylindrical, including square or irregular shapes, as examples.

In the depicted example, the nozzle 268 and mesh device 340 are oriented at an angle relative to flow path 312 of the exhaust. For example, the angle may be approximately 45° relative to a radial direction, although other orientations may be provided. In some examples, the nozzle 268 and mesh device 340 may be perpendicular of the flow path 312, e.g., 0° relative to the radial direction, and in other examples, the nozzle 268 and mesh device 340 may be parallel to the flow path 312, e.g., in an axial direction or 90° relative to the radial direction. In some instances, an angled orientation (e.g., greater than 0° and less than 90° relative to the radial direction) of the nozzle 268 and mesh device 340 may enhance atomization and mixing.

The mesh basket 350 may also have any suitable length 344 and width 346 that are selected to intercept substantially all of the spray 330. In the example of FIG. 3, the mesh basket 350 has a length 344 and width 346 such that the mesh basket 350 only partially extends into the flow path 312 of the exhaust. As shown, the cylindrical wall 310 may be considered to have a diameter 318 and the mesh basket 350 may be considered to have a radial length 348 that is only a portion of the wall diameter 318. The ratio of the radial length 348 to diameter 318 may be any suitable value, including less than or equal to about 1:2 or less than or equal to about 1:3.

Accordingly, even though effectively all of the spray 330 passes through the mesh basket 350, only a portion of the exhaust flow passes through the mesh basket 350. In some instances, this may reduce any backpressure effect of the mesh basket 350 on the flow of exhaust.

The mesh basket 350 may be formed by any suitable material. Examples include chromium, aluminum, iron, nickel, and carbon, although other materials are possible.

The mixing section 360 is downstream of the dosing section 320 and includes a baffle element 362. The baffle element 362 is an array of deflectors 364 through which the exhaust flows. In this example, the baffle element 362 spans the cross-sectional area of the flow path 312, although other arrangements may be provided. The deflectors 364 are disposed at angles to the flow path 312 of the exhaust to create turbulence. The turbulence functions to more evenly mix and distribute the ammonia with the exhaust flow upstream of the SCR catalyst device 270 (FIG. 2). Evenly distributing the ammonia into the exhaust stream improves the efficiency of the SCR system 230 and may also reduce the amount of reductant that is needed to achieve that maximum efficiency. In some examples, the mixing section 360 and/or the baffle element 362 may be omitted. In other examples, alternative and/or additional mixing elements may be provided.

In some examples, the enhanced conversion of reductant into ammonia provided by the mesh device 340 may enhance the mixing by the baffle element 362. Additionally, the mesh device 340 may enable a smaller baffle element 362 and/or shorter mixing section 360.

Figure 4:
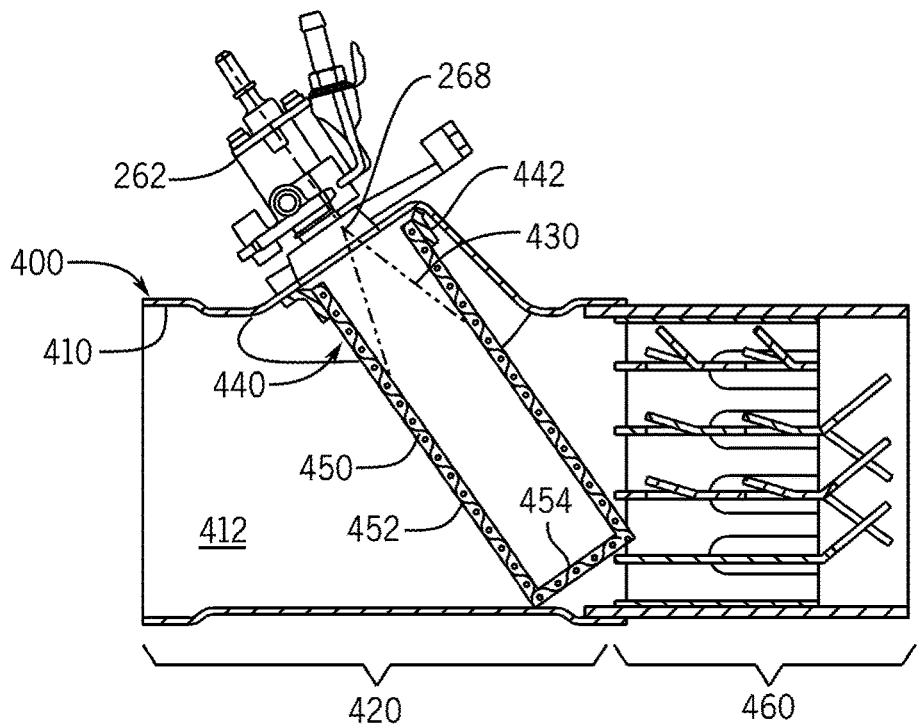
FIG. 4 is a cross-sectional view of a decomposition tube of the exhaust treatment system of FIG. 2 in accordance with another example embodiment.
Figure 5:
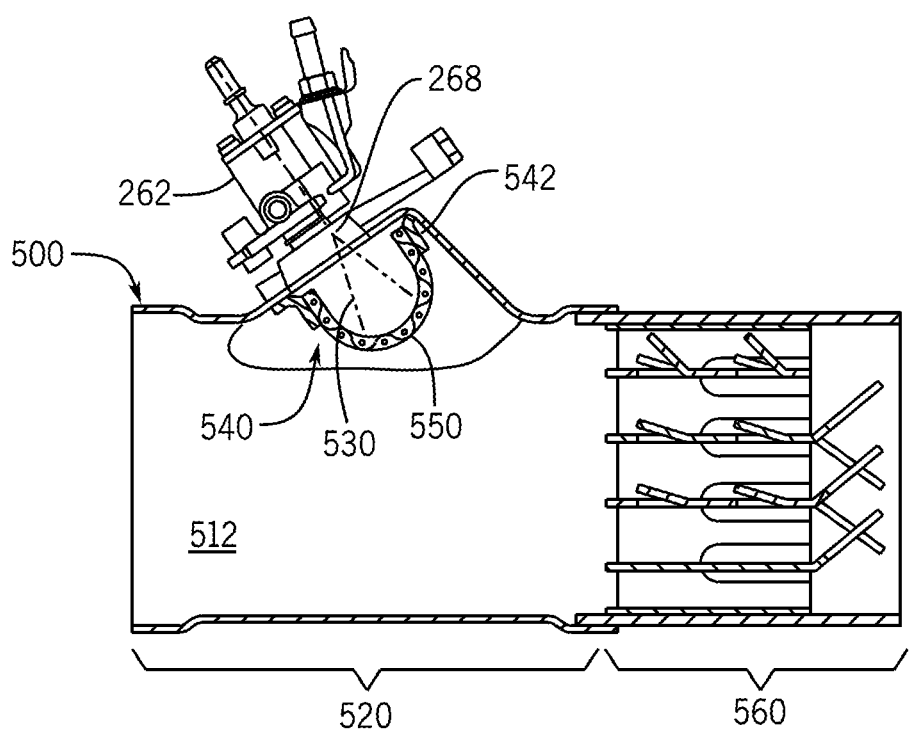
FIG. 5 is a cross-sectional view of a decomposition tube of the exhaust treatment system of FIG. 2 in accordance with another example embodiment.

FIGS. 4 and 5 depict further examples of mesh elements or baskets that may be used in decomposition tubes of treatment systems. In particular, FIG. 4 is a cross-sectional view of a decomposition tube 400 that may be used in an exhaust treatment system, including the exhaust treatment system 210 of FIG. 2. Unless otherwise noted, the decomposition tube 400 may be similar to the decomposition tube 250 described above.

As above, the decomposition tube 400 includes a dosing section 420 upstream of a mixing section 460. The dosing section 420 includes a mesh device 440 proximate to a nozzle 268 of an injection assembly 262 that delivers a spray 430 of reductant into an exhaust flow path 412. The mesh device 440 is secured to a housing wall 410 with a mounting bracket 442, and a mesh element or basket 450 is secured to the mounting bracket 442 such that effectively all of the spray 430 passes through the mesh device 440. As above, the mesh basket 450 has a grid orientation that atomizes the liquid reductant.

In this example, the mesh basket 450 is relatively large with a length and width that extend effectively across the entire diameter of the flow path 412. In this example, the mesh basket 450 is basket-shaped with a cylindrical side wall 452 and a flat bottom wall 454.

As another example, FIG. 5 is a cross-sectional view of a decomposition tube 500 that may be used in an exhaust treatment system, including the exhaust treatment system 210 of FIG. 2. Unless otherwise noted, the decomposition tube 500 may be similar to the decomposition tube 250 described above.

As above, the decomposition tube 500 includes a dosing section 520 is upstream of a mixing section 560. As noted above, in some examples, the mixing section 560 may be omitted. The dosing section 520 includes a mesh device 540 proximate to a nozzle 268 of an injection assembly 262 that delivers a spray 530 of reductant into an exhaust flow path 512. The mesh device 540 is secured to a housing wall 512 with a mounting bracket 542, and a mesh element or basket 550 is secured to the mounting bracket 542 such that effectively all of the spray 530 passes through the mesh device 540. As above, the mesh basket 550 has a grid orientation that atomizes the liquid reductant.

In this example, the mesh basket 550 is relatively small with a length and width that are effectively out of the exhaust flow path 512, such as less than 10% across the diameter of the exhaust flow path 512. In this example, the mesh basket 550 is hemispherical in a compact arrangement to intersect the spray 530 without taking up unnecessary space.

Accordingly, the mesh devices discussed above may reduce or eliminate solid deposits from forming in the decomposition tube, thereby reducing or eliminating the negative impact of such deposits, including blockage or backpressure of exhaust flow, reduction of engine and treatment system performance and efficiency, disruption the flow and mixing of the reductant into the exhaust stream, and inefficient reductant use. These advantages may be provided with a significant reduction in space and cost relative to other designs. Additionally, the examples described above may enable the engine to operate at elevated temperatures to achieve improved fuel economy, even while maintaining or reducing emission levels of pollutants. FIGS. 1-5 provide examples of configurations and arrangements of exhaust treatment systems. However, the description above is generally applicable to any type of exhaust treatment system.

Any flowchart and block diagrams in the figures, or similar discussion above, can illustrate the architecture, functionality, and operation of possible implementations of systems, methods and computer program products according to various embodiments of the present disclosure. In this regard, each block in the flowchart or block diagrams can represent a module, segment, or portion of code, which includes one or more executable instructions for implementing the specified logical function(s). It should also be noted that, in some alternative implementations, the functions noted in the block (or otherwise described herein) can occur out of the order noted in the figures. For example, two blocks shown in succession (or two operations described in succession) can, in fact, be executed substantially concurrently, or the blocks (or operations) can sometimes be executed in the reverse order, depending upon the functionality involved. It will also be noted that each block of any block diagram and/or flowchart illustration, and combinations of blocks in any block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A decomposition tube for an exhaust gas treatment system, comprising:
   a housing having a housing wall that defines an exhaust flow path for exhaust gas from an engine;
   a reductant nozzle coupled to the housing and configured to deliver a spray of reductant into the exhaust flow path;
   a mesh basket mounted to the housing wall proximate the reductant nozzle;
   wherein the mesh basket defines a side wall and a bottom wall to enclose and intercept the reductant spray;
   wherein the mesh basket is made of interwoven wires in a grid configuration through which are intervening spaces for reductant droplets to pass through the intervening spaces in the side wall and the bottom wall of the mesh basket and into the exhaust flow path prior to impinging on the housing wall; and
   wherein the mesh basket extends into the exhaust flow path to have only a portion of the exhaust gas passing through the mesh basket; and
   a baffle arranged downstream of the mesh basket to mix the reductant from the mesh basket with the exhaust gas.

2. The decomposition tube of claim 1, wherein the side wall is cylindrical and the bottom wall is flat.

3. The decomposition tube of claim 2, wherein the cylindrical side wall circumscribes the spray and the bottom wall is perpendicular to a direction of the spray.

4. The decomposition tube of claim 3, wherein the cylindrical side wall is centered on the spray.

5. The decomposition tube of claim 1, wherein the mesh basket has a hemispherical shape.

6. The decomposition tube of claim 1, wherein the mesh basket has a radial length relative to the exhaust flow path that is less than half of a diameter of the exhaust flow path.

7. The decomposition tube of claim 1, wherein the mesh basket has a radial length relative to the exhaust flow path that is less than a third of a diameter of the exhaust flow path.

8. The decomposition tube of claim 1, wherein the mesh basket extends across the exhaust flow path.

9. The decomposition tube of claim 1, wherein the mesh basket is angled relative to the exhaust flow path.

10. The decomposition tube of claim 1, wherein the housing includes a generally cylindrical wall that defines the exhaust flow path, the cylindrical wall defining a mounting aperture, and wherein the reductant nozzle is mounted to the cylindrical wall at the mounting aperture in the cylindrical wall.

11. An exhaust g treatment system for treating exhaust gas from an engine, comprising:
    an inlet tube for receiving the exhaust gas from the engine;
    a particulate filter fluidly coupled to receive the exhaust gas from the inlet tube;
    a selective catalytic reduction system coupled to receive the exhaust gas from the particulate filter, wherein the selective catalytic reduction system comprises:
    a decomposition tube with a housing defining an exhaust flow path for the exhaust gas;
    a reductant nozzle coupled to the housing and configured to deliver a spray of reductant into the exhaust flow path;
    a mesh basket mounted proximate the reductant nozzle;
    wherein the mesh basket defines a side wall and a bottom wall to enclose and intercept the reductant spray;
    wherein the mesh basket is made of interwoven wires in a grid configuration through which are intervening spaces for reductant droplets to pass through the intervening spaces in the side wall and the bottom wall of the mesh basket and into the exhaust flow path prior to impinging on the housing wall; and
    wherein the mesh basket extends into the exhaust flow path to have only a portion of the exhaust gas passing through the mesh basket, and
    a catalyst device fluidly coupled to receive the mixture of the reductant and the exhaust gas from the decomposition tube and configured to reduce NOx in the exhaust with the reductant;

a baffle arranged downstream of the mesh basket to mix the reductant from the mesh basket with the exhaust gas; and an outlet tube coupled to receive the exhaust gas from the selective catalytic reduction system.

12. The exhaust treatment system of claim 11, wherein mesh basket secured to the housing.

13. The exhaust treatment system of claim 12, wherein the mesh basket includes a cylindrical side wall and a flat bottom wall, and wherein the cylindrical side wall circumscribes the spray and the bottom wall is perpendicular to a direction of the spray.

14. The exhaust treatment system of claim 12, wherein the mesh basket has a hemispherical shape.

15. The exhaust treatment system of claim 12, wherein the mesh basket has a radial length relative to the exhaust flow path that is less than half of a diameter of the exhaust flow path.

16. The exhaust treatment system of claim 12, wherein the mesh basket has a radial length relative to the exhaust flow path that is less than a third of a diameter of the exhaust flow path.

17. The exhaust treatment system of claim 12, wherein the mesh basket extends across the exhaust flow path.

* * * * *

UNITED STATES PATENT AND TRADEMARK OFFICE
CERTIFICATE OF CORRECTION

PATENT NO. : 10,519,832 B2
APPLICATION NO. : 15/167442
DATED : December 31, 2019
INVENTOR(S) : Gavin et al.

Page 1 of 1

It is certified that error appears in the above-identified patent and that said Letters Patent is hereby corrected as shown below:

In the Claims

Column 10, Claim 11, Line 38, delete "g treatment" and insert -- gas treatment --, therefor.

Column 10, Claim 11, Line 60, delete "the housing" and insert -- a housing --, therefor.

Column 11, Claim 12, Line 6-7, delete "wherein mesh" and insert -- wherein the mesh --, therefor.

Signed and Sealed this
Seventeenth Day of March, 2020

Andrei Iancu
*Director of the United States Patent and Trademark Office*